April 4, 1939. R. H. CRAMER 2,152,875
GRINDING, GAUGING, AND SIZING
Filed Nov. 23, 1937   2 Sheets-Sheet 2

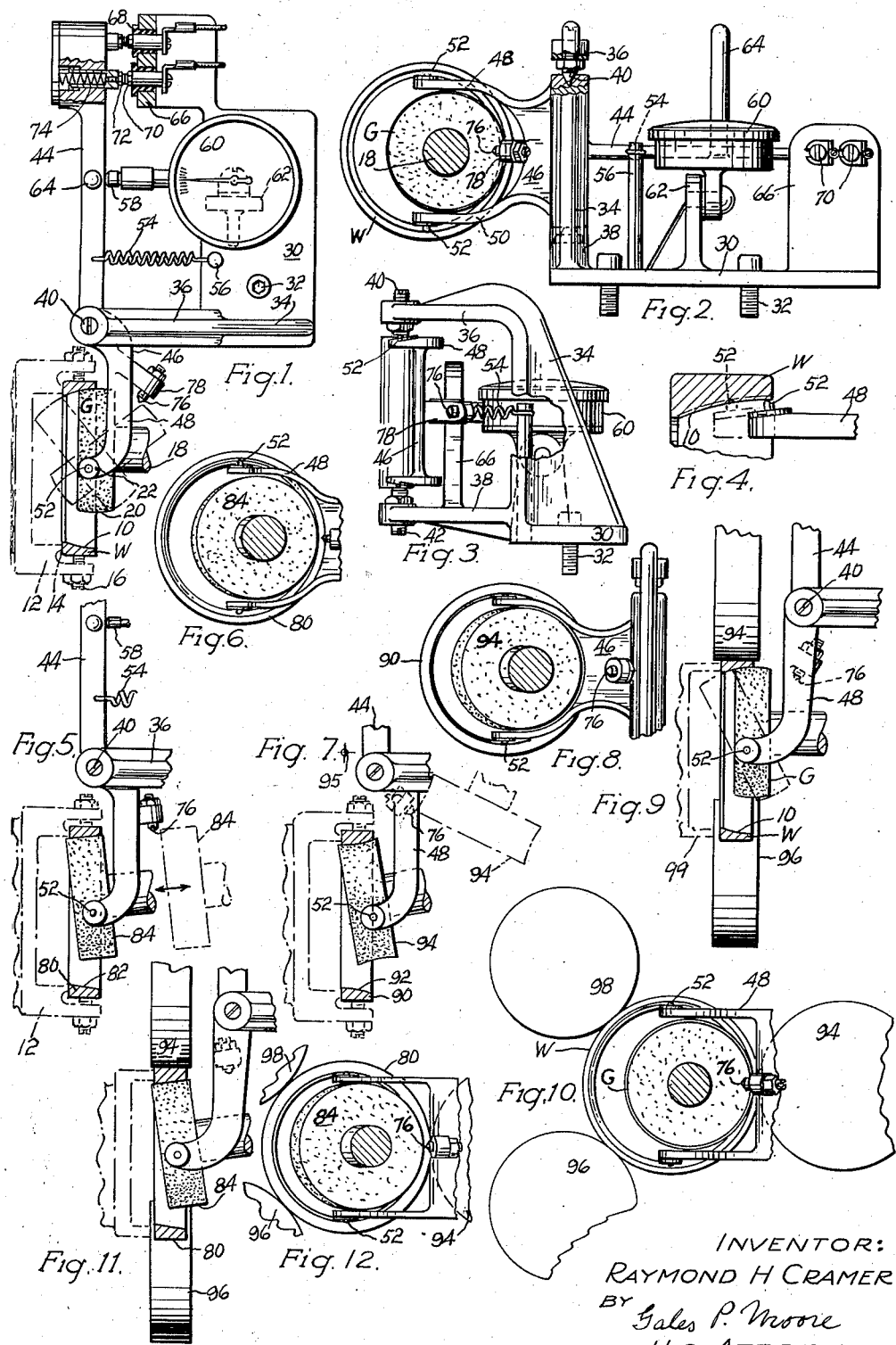

INVENTOR:
RAYMOND H CRAMER,
BY Gales P. Moore
HIS ATTORNEY.

Patented Apr. 4, 1939

2,152,875

UNITED STATES PATENT OFFICE 2,152,875

GRINDING, GAUGING, AND SIZING

Raymond H. Cramer, Newark, N. J., assignor to General Motors Corporation, Detroit, Mich., a corporation of Delaware Application November 23, 1937, Serial No. 176,083

17 Claims. (Cl. 51—165)

This invention relates to grinding, gauging and sizing and comprises all of the features and aspects of novelty herein disclosed in connection with a machine for grinding a surface of revolution to a predetermined size. In common types of internal grinding machines, it is the practice to gauge the work during the grinding operation by plug gauges, feeler gauges or the like. In the usual plug type of gauge, a rod reciprocates through the chuck axis and carries gauge plugs which attempt to enter the bore of the work as the diameter increases. For accurate gauging, the size and shape of the plugs must be maintained in use and the upkeep on the plug type of gauge is high. In the feeler type of gauge, a gauge feeler engages the bore of the work and is mounted to move substantially radially of the work as the diameter increases. Inasmuch as the amount of stock removed is small, the total movement of the feeler is correspondingly small and sensitively can only be obtained by some form of multiplying mechanism connected to the feeler. This also leads to undue expense.

Accordingly, an object of the invention is to provide an improved gauging device and method which will diminish or avoid the above mentioned and other disadvantages of prior practices. Another object is to provide a gauging device and method which will promote sensitivity and accuracy by the manner of presenting the gauge to the work surfaces. Another object is to provide a gauging device of the comparator type which is reliable, inexpensive and sensitive, and applicable to test or compare the size of articles or to control the sizing of various kinds of surfaces of revolution. Still another object is to provide an improved gauging or sizing device for controlling the grinding or other machining of a series of work-pieces to a predetermined size. Yet another object is to provide improved means for effecting dressing or truing of a grinding wheel.

To these ends and also to improve generally upon devices of the character indicated, the invention consists in the various matters hereinafter described and claimed. In the accompanying drawings Fig. 1 is a plan view, with parts in section, of the improved gauge applied to the gauging or sizing of an internal surface of revolution having the shape of a spherical segment.

Fig. 2 is a side elevation of Fig. 1, the chuck being omitted.

Fig. 3 is a front elevation.

Fig. 4 is an enlarged sectional view of the work indicating the ample movement of a gauge feeler in response to a comparatively small increase in diameter of the work.

Fig. 5 is a plan view similar to Fig. 1 with the gauge applied to the gauging or sizing of an internal work surface which is conical.

Fig. 6 is a side elevation of a portion of Fig. 5.

Fig. 7 is a plan view similar to Fig. 1 with the gauge applied to the gauging or sizing of an internal work surface which is generated by an arc revolved about the axis of the piece.

Fig. 8 is a side elevation of a portion of Fig. 7.

Fig. 9 is a plan view similar to Fig. 1 with the same work supported by rotatable wheels in place of a chuck.

Fig. 10 is a side elevation of a portion of Fig. 9.

Fig. 11 is a plan view similar to Fig. 5 with the same work supported by rotatable wheels in place of a chuck.

Fig. 12 is a side elevation of a portion of Fig. 11.

Figure 13:
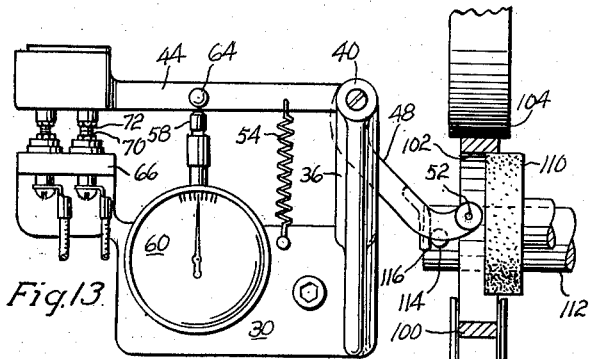
Fig. 13 is a plan view of a modification wherein the gauge is applied to the gauging or sizing of an internal surface which is cylindrical.

In Figs. 1, 2, 3 and 4, a work-piece W has an internal surface 10 shaped as a segment of a sphere which is to be ground to a predetermined size and in predetermined relation to the end face of the piece. Any suitable chuck 12 may be provided to rotate the piece on its axis, the illustrated chuck having a work locating face 14 engaging the end of the piece while clamping screws 16 grip the periphery. A grinding wheel G having a driven spindle 18 generates the desired contour on the work by having a convexly curved surface 20 corresponding to the desired work surface. Either the work or the grinding wheel is oscillated about a center 22 to grind the full width of the work surface. This center of oscillation preferably lies at the center of curvature of the work surface 10 and, in this instance, lies both in the axis of the piece and in the plane of its end face. For convenience of illustration, the amplitude of oscillation for grinding is indicated by a broken line showing of the grinding wheel. Any suitable mechanism such as shown in patent to Van Norman, Reissue No. 13,892 is used to feed the wheel against the work, to cause the wheel to enter the work, and to cause the relative oscillation.

Mounted to oscillate with the work, if the work is oscillated, is a feeler gauge having a base 30 secured by screws 32 to the work head or to the same member which supports and oscillates the work head. The base 30 has a standard 34 having an upper arm 36 and a lower arm 38 carrying aligned pivot screws 40 and 42, respectively. The pivots may be of any suitable type to mount a gauge lever for accurate swinging movement on an axis which lies in a transverse plane perpendicular to the work axis. The gauge lever has a long arm 44 which, as will appear, actuates a dial indicator and electric contacts or either of such members. The lever also has an arm comprising a yoke 46 with an upper arm 48 and a lower arm 50 each having a feeler 52 to contact with the work surface, the feelers being urged substantially axially of the work by a coil spring 54 connecting the lever 44 to a stud 56 on the base 30. The lever preferably bears against the stem 58 of a dial indicator 60 which is clamped to a lug 62 on the base. A handle 64 serves to swing the feelers outwardly as when loading or unloading the chuck. The lever can be adjusted vertically by means of the pivot screws 40 and 42 to place the opposed feelers at the same distance from the axis of the piece.

The points of contact on the work need not be diametrically opposite nor is it necessary to have two feelers. When the gauge points are not diametrically opposite and so engage the work a little to one side of a vertical diameter, they do not tend to lock with the work which would tend to cause rotation. The gauge is preferably used as a comparator and is set by an accurately sized master piece or standard article having the size of the desired product. As indicated in Fig. 4, a piece of the type indicated has a surface 10 which tapers slightly and very gradually becomes smaller axially from its mouth and, when a small amount of material is removed in the grinding operation, the feeler has a comparatively large movement substantially parallel to the work axis. Thus the effect of multiplication is obtained without depending on multiplying levers or the like as in the case where a feeler moves radially of a piece and responds directly to the increase in size. Thus the manner of presenting the feelers to the work provides great sensitivity. It is evident that the gauge is not restricted to use with a piece which is being ground or otherwise changed in size but will indicate the degree to which a piece varies from a standard. It can also be easily adapted to measure size directly.

In order to make the gauge available to control a grinding operation, the lever 44 may carry one or more electric contact making members. One circuit may control a dressing operation on the grinding wheel and the other may control the final separation of the wheel from the work, for instance. Or the circuits may control the degree of cross feed of the grinding wheel and the stopping of the feed or other functions as desired. Two such controls are indicated for illustrative purposes. A bracket 66 carries insulating bushings 68 for contact pins 70 which are initially spaced from adjustable contact screws 72 carried by spring pressed plungers 74 mounted near the end of the lever 44. One of the contact screws makes contact a little before the other and then yields while that other contact screw moves ahead to contact-making position. The contacts as well as the dial indicator are initially set with the aid of a master.

In order to maintain the shape of the wheel and have a fresh cutting surface, the wheel is dressed at any desired point or points in the cycle of grinding as controlled by the gauge. To effect this, a dressing diamond is mounted on the end of a screw 76 which is adjustably secured by a lock nut to a bracket or arm 78 projecting from the gauge yoke 46. The dresser is located in the geometric continuation of the spherical surface 10 at a point where it does not touch the wheel during the grinding oscillation. When, however, it is desired to dress the wheel, the amplitude of oscillation is increased for one stroke and the wheel and the dresser have a relative arcuate traversing movement, one across the other. The dresser is so located that the dresser and the wheel do not engage one another until the wheel and the work are entirely disengaged. By mounting the dresser on the gauge lever, the dresser is withdrawn from operative position whenever the gauge feelers are swung out of the work, as for unloading the chuck. The dresser also comes back to a definite position as controlled by the feelers.

Figs. 5 and 6 show the application of the invention to the internal grinding of a work-piece 80 having a conically tapered internal surface 82. In this case the grinding wheel 84 is preferably cylindrical and is reciprocated axially at a fixed angle to the work axis. The dresser 76 is mounted in the path of axial reciprocation of the wheel upon an amplified stroke as indicated.

Figs. 7 and 8 show the invention applied to internal grinding of a work-piece 90 whose inner surface 92 is transversely convex. The line where this surface is engaged by a correspondingly shaped grinding wheel 94 is a circular arc curved about a center 95 which is outside of the piece and preferably in the plane of the end face. In operation, the grinding wheel, or the work and the gauge together, oscillate as a unit about the center 95 to effect the grinding. The dresser 76 is located in the continuation of the surface 92 to engage the grinding wheel upon the amplified stroke indicated by broken lines.

Figs. 9 and 10 are similar to Figs. 1 and 2 except that the work W is supported and rotated by a work head having a series of wheels. One wheel 94 is a regulating wheel, another wheel 96 is a supporting idler wheel, and a third wheel 98 is a pressure idler wheel. To prevent endwise movement of the work, it is backed up and located endwise by a rotary plate 99 engaging one end of the work and recessed to make room for the grinding wheel during oscillation. The feeler arms have their pivotal axis 40 beside the wheel 94 and out of the plane of the work-piece.

Figs. 11 and 12 are similar to Figs. 5 and 6 except that the work-piece 80 is supported and rotated by the chuckless work head of Figs. 9 and 10.

Figure 14:
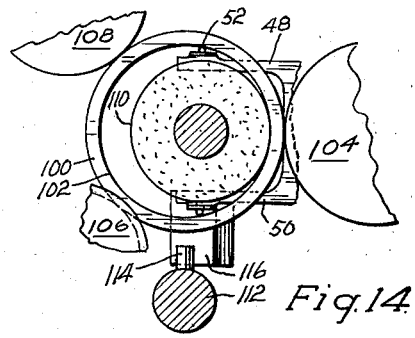
Fig. 14 is a side elevation of a portion of Fig. 13, the gauge retracting rod and the wheel spindle being in section.

In Figs. 13 and 14, the work-piece 100 has an internal cylindrical surface 102 and is supported and rotated by a regulating wheel 104, by a supporting idler wheel 106 which is grooved or flanged to prevent endwise movement of the work, and by a pressure idler wheel 108. This leaves both ends of the work open and the gauge feelers can enter the work from the end opposite to the grinding wheel 110. The feeler arms extend at an angle to the plane of the work from the pivotal axis 40. Otherwise stated, the arms extend at an angle to a transverse plane across the axis of the work and the feelers are spaced apart a distance slightly less than the unground diameter of the piece in order that they may enter the piece and in order that they may not tend to stick to the piece and tend to be rotated thereby. The feelers have a component of movement crosswise of the work axis so that they tend to move along a chord as viewed from the end of the piece. Otherwise stated, they engage the surface closely adjacent to a selected diameter and move in a plane normal to that diameter. At the contact points, which are near the vertical diameter of the piece, the piece presents a surface which gradually becomes smaller in a crosswise direction (and the slope of the surface is even less in the actual path of the feelers) so that the desired principles of amplification occur. That is, there is a comparatively large movement of the feelers for a small increase in the bore diameter.

The location of the pivotal axis 40 can be varied but in order to get the benefit of amplification plus quick removal of the feelers from the work, the feeler arms preferably make an angle of about 45° with the work axis, the end portions of the arms preferably being bent or offset to better clear the piece. In order to make it possible to utilize a grinding wheel of maximum diameter and reduce wear on the feeler points, the feelers may be intermittently withdrawn from the work at one end whenever the grinding wheel enters from the other end. To accomplish this, a rod 112 is mounted to reciprocate with the grinding wheel head and carries a roller or pin 114 adapted to abut against a hardened plate 116 depending from the lower feeler arm 50. This plate is elongated crosswise of the work axis to maintain operative contact with the pin 114 as the feelers are swung out of the work at each advance of the reciprocating grinding wheel with the rod 112. When the grinding wheel is small enough to pass between the feeler arms, the feelers can be kept in contact with the work during grinding if desired and they can enter the work from the same end as the grinding wheel.

Figures 15, 16:
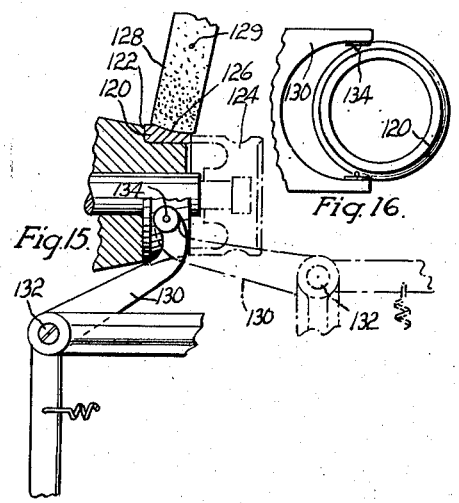
Fig. 15 is a plan view of a modification wherein the gauge is applied to the gauging or sizing of an external surface of revolution which is generated by revolving an arc around the axis of the piece.
Fig. 16 is a side elevation of a portion of Fig. 15.

Figs. 15 and 16 show the invention applied to the gauging of an external surface of revolution. A work-piece 120 is clamped against a locating shoulder 122 by a clamping member 124, and has a tapered external surface 126 which is transversely concave. The surface is that generated by a circular arc rotated around the work axis. A grinding wheel 128 has a convex surface of corresponding contour. The center of transverse curvature is preferably at a point 129 in the plane of the end of the piece and relative oscillation occurs around such axis, between the grinding wheel on the one hand and the work and the gauge on the other. The gauge has feeler arms 130 with a pivotal axis at 132. The arms have feelers 134 located a distance apart slightly less than the finished diameter of the work surface so that the feelers always engage the work a little to one side of a vertical diameter. Each feeler moves in a plane normal to this vertical diameter. The feeler arms preferably lie at an angle to the plane of the work and the feelers then have a component of movement crosswise of the work axis as well as lengthwise thereof. Hence they have a comparatively large movement, along a gradually enlarging surface, for a small decrease in the size of the work and so the advantages of amplification and sensitivity are obtained. If desired, the pivotal axis may be located in the plane of the work so that the movement of the feelers is substantially parallel to the work axis. The axis may also be beyond the end of the piece as indicated by broken lines. Each feeler then has a large component of movement or chord-like path crosswise of the work axis towards a larger portion of the piece but there is also a component of movement parallel to the work axis and towards a smaller portion of the piece. This is conducive to sensitivity because the effect is to diminish the slope of the work surface with respect to the path of the feeler.

Figure 17:
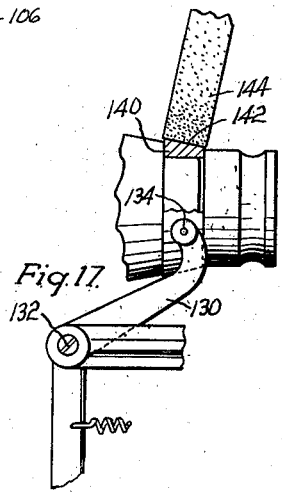
Fig. 17 is a plan view similar to Fig. 15 with the gauge applied to an external work surface which is conical.

Fig. 17 shows the invention applied to the gauging of a work-piece 140 having a conical external surface 142 to be ground by a cylindrical grinding wheel 144. The pivotal axis can be located as in Figs. 15 and 18.

Figure 18:
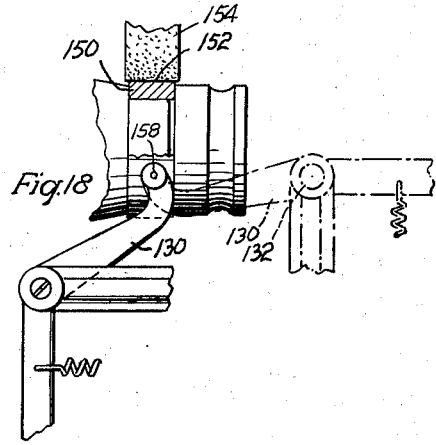
Fig. 18 is a plan view similar to Fig. 15 with the gauge applied to an external work surface which is cylindrical.
Figure 19:
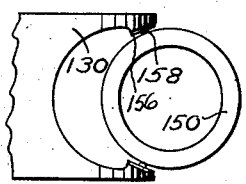
Fig. 19 is a side elevation of a portion of Fig. 18.

Figs. 18 and 19 show the gauge applied to the gauging of a work-piece 150 having an externally cylindrical surface 152 to be ground by a cylindrical grinding wheel 154. The feeler arms 130 are bent and have sloping terminals 156 carrying feelers 158. The pivotal axis is located at a point to permit a substantial movement of the feelers towards a vertical diameter of the work with a component lengthwise of the piece to increase sensitivity. In Figure 18, as well as in Figs. 15 and 17, the pivotal axis of the feeler arms may be placed beyond the end of the piece as indicated by broken lines so that each feeler moves along a chord-like path.

In operation, the gauge is set by placing a master piece of the exact size desired in the work holder. The dial indicator is then set to read at zero. The electric contacts when used are also set by the aid of one or more masters to complete circuits at the desired points in the machine cycle. Upon substituting an unground product piece for the master, grinding proceeds under control of the gauge until the piece is to size, there being a short interruption while the amplified stroke occurs to dress the grinding wheel. As above indicated, the gauge preferably operates as a comparator to control grinding but it is also applicable to compare sizes or to measure the actual size of a finished product.

I claim:

1. The method of gauging a surface of revolution on a work-piece, which consists in urging a feeler to swing around an axis to press the feeler into contact with the surface at a point near that diameter of the piece which lies parallel to the feeler axis, and utilizing the movement of the feeler from a normal position to compare sizes; substantially as described.

2. The method of gauging a surface of revolution which gradually changes in diameter in a direction lengthwise of its axis, which consists in presenting a feeler against the surface of revolution, urging the feeler to move in a direction substantially parallel to said axis while maintaining the feeler at a substantially constant distance from said axis, and utilizing the movement of the feeler from a normal position to compare sizes; substantially as described.

3. The method of controlling the sizing of a work-piece having a surface of revolution which gradually changes in size in a line of direction parallel to its axis, which consists in rotating the piece on its axis, presenting a feeler against the unground surface of revolution, presenting a grinding wheel to the surface, continuously urging the feeler to move substantially parallel to the work axis to keep in contact with the surface of revolution as the size changes, and utilizing the movement of the feeler along the ground surface to control the grinding operation; substantially as described.

4. The method of controlling the sizing of an internal surface of revolution on a hollow work-piece, which consists in rotating the piece on its axis, presenting spaced feelers against the unground surface of revolution at points to one side of a selected diameter, presenting a grinding wheel to the surface, urging each feeler to have a movement in a plane normal to the selected diameter of the piece as the internal surface engaged by the feeler increases in size, and utilizing the movement of the feelers along the ground surface to control the grinding operation; substantially as described.

5. The method of controlling the sizing of an internal surface of revolution on a hollow work-piece, which consists in rotating the piece on its axis with both ends open, moving a feeler into one end of the piece to engage the surface of revolution near a selected diameter, presenting a grinding wheel to the surface from the opposite end of the piece, constantly urging the feeler to move in a plane normal to the selected diameter as the surface engaged by the feeler is ground, and utilizing the movement of the feeler along the ground surface to control the grinding; substantially as described.

6. In a device of the character described, means for supporting and rotating a round work-piece on its axis, a feeler arm having a pivotal axis, a feeler engaging the surface of the piece at a point near a diameter which lies parallel to the pivotal axis of the arm, means for urging the arm to swing around its axis, and means controlled by the movement of the arm from a predetermined position to test the size of the piece; substantially as described.

7. In a device for gauging an internal surface on a work-piece, means for supporting and rotating the piece on its axis, a feeler arm, a feeler carried by the arm to engage the internal surface of the piece near a diameter thereof, means controlled by the position of the arm to test the size of the piece, the feeler arm extending at an angle to a plane extending directly across the axis of the piece and having a pivotal axis parallel to said plane and to said diameter, and means for causing the arm to swing around said pivotal axis to move the feeler into and out of contact with the internal work surface; substantially as described.

8. In a machine for grinding a work-piece having a surface which tapers gradually in an axial direction, means for supporting and rotating the piece on its axis, a feeler engaging the tapering surface, means for urging the feeler to move in a direction substantially parallel to the axis of the piece while the feeler engages the tapering surface, a grinding wheel engaging the surface, and means responsive to movement of the feeler to control the grinding; substantially as described.

9. In a machine for grinding a work-piece to a predetermined size, means for supporting and rotating the piece on its axis, a pair of spaced feelers engaging the piece near a selected diameter thereof, a grinding wheel adapted to pass between the feelers to engage the piece at another location, means for urging the feelers to move in parallel planes normal to the selected diameter, and means responsive to movement of the feelers to control the grinding; substantially as described.

10. In a machine for grinding the internal surface of a hollow work-piece to a predetermined size, means for supporting and rotating the piece on its axis with both ends open, a grinding wheel entering the piece at one end, a feeler arm entering the other end and having a feeler engaging the surface near a selected diameter, means for urging the feeler to move in a plane normal to the selected diameter, means actuated by such movement of the feeler to control the grinding, and means to engage the feeler and responsive to entry of the grinding wheel into the piece to retract the feeler therefrom; substantially as described.

11. In a machine for generating a surface of revolution on a work-piece, means for supporting and rotating the piece on its axis, a feeler arm having a feeler engaging the surface, a grinding wheel engaging the surface, the grinding wheel and the piece having a relative oscillation while in contact, and a dresser mounted on the feeler arm in a position to engage the wheel upon an increase in the amplitude of oscillation; substantially as described.

12. In a machine for generating a surface of revolution on a work-piece, means for supporting and rotating the piece on its axis, a feeler arm having a feeler engaging the surface, a grinding wheel engaging the surface, the grinding wheel and the piece having a relative oscillation while in contact, means for operating the feeler arm to move the feeler into and out of contact with the surface, and a dresser mounted on the feeler arm to move into and out of a position in the geometric continuation of the surface; substantially as described.

13. In a machine for generating an internal surface of revolution on a hollow work-piece, means for supporting and rotating the piece on its axis, a feeler arm entering the piece and having a feeler engaging the internal surface, a grinding wheel engaging the surface, the grinding wheel and the piece having a relative oscillation while in contact to generate the surface, a pivotal mounting for the feeler arm to swing the feeler into and out of the work, and a dresser mounted on the feeler arm to swing into and out of operative position with the feeler; substantially as described.

14. In a machine for generating a curved surface of revolution on a work-piece, means for supporting and rotating the piece on its axis, a grinding wheel engaging the surface, the grinding wheel and the piece having a relative oscillation in a curved path to generate the curved surface, a supporting arm, and a wheel dresser mounted on the arm beyond the surface and located in the geometric continuation thereof to engage the wheel upon an increase in the amplitude of oscillation whereby the same axis of oscillation serves for both grinding of the work and dressing of the wheel; substantially as described.

15. In a device of the character described, means for supporting a work-piece, a grinding wheel engaging the piece, a gauge having means engaging the piece to control the size, and a wheel dresser mounted on the gauge and located with respect to the grinding wheel by the gauge; substantially as described.

16. In a device of the character described, means for supporting a work-piece, a grinding wheel engaging the piece, a work gauging member and a wheel dresser having a mounting in common, the gauging member engaging the work to locate the dresser with respect to the wheel, and means for shifting the mounting to simultaneously carry the gauging member and the dresser into or out of operative relation to the piece and to the wheel; substantially as described.

17. In a machine for generating a surface of revolution on a work-piece, means for supporting and rotating the piece, a grinding wheel engaging the surface, a wheel dresser located in the geometric continuation of the surface, and means engaging the surface for supporting and locating the dresser; substantially as described.

RAYMOND H. CRAMER.